(12) United States Patent
Geofroy et al.

(10) Patent No.: US 7,124,163 B2
(45) Date of Patent: Oct. 17, 2006

(54) DATA SERVER

(75) Inventors: Paul Joseph Geofroy, Burnaby (CA); Grant William Henderson, Port Coquitlam (CA); Brian Garland Sharratt, Burnaby (CA)

(73) Assignee: Convedia Corporation, Burnaby (CA)

( * ) Notice: Subject to any disclaimer, the term of this patent is extended or adjusted under 35 U.S.C. 154(b) by 700 days.

(21) Appl. No.: 10/153,820

(22) Filed: May 24, 2002

(65) Prior Publication Data

US 2003/0220964 A1      Nov. 27, 2003

(51) Int. Cl.
*G06F 15/16* (2006.01)
(52) U.S. Cl. .................... 709/203; 709/205
(58) Field of Classification Search ............... 709/203, 709/230
See application file for complete search history.

(56) References Cited

U.S. PATENT DOCUMENTS

| | | | |
|---|---|---|---|
| 5,742,840 A | | 4/1998 | Hansen et al. |
| 6,452,809 B1* | | 9/2002 | Jackson et al. ............. 361/796 |
| 6,459,780 B1* | | 10/2002 | Wurster et al. ........ 379/142.02 |
| 6,735,218 B1* | | 5/2004 | Chang et al. ................ 370/471 |
| 6,898,179 B1* | | 5/2005 | Bass et al. ................... 370/229 |
| 2002/0152305 A1* | | 10/2002 | Jackson et al. ............. 709/224 |
| 2002/0160752 A1* | | 10/2002 | Hook et al. .................. 455/412 |
| 2003/0033463 A1* | | 2/2003 | Garnett et al. .............. 710/300 |
| 2003/0097428 A1* | | 5/2003 | Afkhami et al. ............ 709/220 |
| 2003/0097487 A1* | | 5/2003 | Rietze et al. ................ 709/325 |

* cited by examiner

*Primary Examiner*—David Wiley
*Assistant Examiner*—Lan Dai Thi Truong
(74) *Attorney, Agent, or Firm*—Marks & Clerk; Richard J. Mitchell (57) ABSTRACT

A data server for use in networks in which media signals are transmitted as digital signals in packet form comprises at least one shelf having at least one card whose purposes are to provide a shelf controller function and a media processor function, together with a plurality of backplane buses. The data server accesses media signals in packet form. Distributed software is distributed in the cards on the shelf, and consists of a modular software architecture having a transport layer, a media processing layer, a session control layer, and a management plane which spans across the other layers. A plurality of digital signal processors has a plurality of dynamically changeable discrete software objects so as to process packets of media data. The management plane provisions and monitors the operations of said data server, and gives alarms in keeping with predetermined criteria. There is at least one connection interface to a packet network from which media signals in media form are received. The distributed software architecture media processing layer includes a software manager for initializing, coordinating, and controlling the plurality of discrete software objects embedded in the plurality of digital signal processors

32 Claims, 3 Drawing Sheets

FIG. 1

Media Packets — 56

DATA SERVER

FIELD OF THE INVENTION

This invention relates to data servers, and particularly to data servers which specifically function as media servers for use in networks where media are transmitted in packet form. Such networks include those which may be used for telephony, video conferencing, and the like, where the networks are VoIP/VoATM telephony networks, PSTN or other non-packet telephony networks, wireless telephony networks, and combinations thereof, or others. However, the present invention particularly relates to the software architecture of data servers such as media servers which are capable of providing processing services for value added purposes to various media networks where the media are transmitted in packet form.

BACKGROUND OF THE INVENTION

Data servers generally find themselves in many circumstances for many purposes. However, the present invention is particularly directed to the use of data servers in media networks where the media data are transmitted in packet form. Such uses may specifically be in the purposes of media gateways and media servers for media networks such as telephony networks.

Indeed, it is in the environment of telephony networks where the present invention finds particular utility. Telephony networks carry voice data, in particular, which has been coded into digital format. However, while the human ear may be forgiving to a certain extent, it will not tolerate significant interruptions or delay in the passage of spoken messages. In other words, unlike data networks in which delays or interruptions in the delivery of packetized data may be tolerated, at least to some extent, the transmission and processing of voice messages, and also video messages and the like, must take place essentially in real time. Thus, data servers such as gateways and media servers must be constituted in such a manner that they are capable of functioning with high throughput and accuracy of data management and processing.

The following discussion is particularly directed to data servers, and how a data server may be included in a network. Particular discussion follows as to the configuration of data servers when used as media servers; but it will be understood that the discussion is applicable as well to gateways and other configurations of data servers, as will be clear to those who are skilled in the art.

Data servers which are configured as media servers, as they are employed in telephony networks, perform a variety of basic and enhanced services which include conferencing, interactive voice response, transcoding, announcement, and other advanced speech services. They may also be employed in networks which provide video conferencing services, as well as typical data exchange services of the sort which occurs over the Internet, over virtual private networks, within wide area networks and local area networks, and the like. In each instance, the data of any sort, whether it be voice, video, numerical or text data, or a multimedia stream comprising any combination of these data, is packetized—that is, the data are sent in packets.

Media servers are connected directly to a packet network, and may therefore be found in use in many service provider locations including those who provide wireless, cable modem, xDSL, fibre, and copper access technologies; provided, however, that the core network within which the immediate server may be found is one which is based on packet technologies such as IP, ATM, Frame Relay, and variations of such technologies as they are used for mobile telephony.

Media servers perform real time processing of media streams which may originate from such devices as personal computers, IP phones, mobile phones, and traditional phones, via an appropriate media gateway. Typical functions that may be performed by media servers include decoding and collecting DTMF tones, or coded messages indicating the presence of DTMF tones. They may also play complex audio announcements stored on a data server or on an external file server, they may bridge multiple audio signals, they may transcode between different codec types and bit rates, they may level shift the level of audio signals for manual or automatic gain control, and they may convert text to speech or speech to text. Media servers may also recognize voice commands, bridge video signals, detect which party in a conference is speaking—or speaking the loudest—and decode/encode fax streams.

Typically, media servers are part of an enhanced services infrastructure in packet networks which use a decomposed architecture, such as softswitch architecture, PacketCable™ architecture, 3GPP/UTMS/EuroCable architecture, etc. The media servers will act as slaves to service logic which is resident in an application server, or will respond to similar control agents in the switching plane of a control network, and they will provide state-of-the-art hardware which may be upgraded and which exhibits almost unlimited scaleability, without regard to the service logic which may be employed in an application server or softswitch, and without regard to whether or not there is the presence of a media gateway such as that which is required for other than pure VoIP/VoATM telephony.

Two other co-pending applications, Ser. Nos. 10/153,666, and 09/636,633, filed simultaneously herewith, describe other features and particularities of data servers, and particularly media servers of the sort generally contemplated herein. The present invention is particularly directed to the architecture of distributed software which is found on a data server in keeping with the present invention.

Of course, it will be kept in mind that data servers in keeping with the present invention may be dynamically upgraded, and are scaleable, so that the distributed software per se found in a data server in keeping with the present invention, as it may be discussed hereafter, is exemplary only because such software—and particularly the discrete software objects—may be continually upgraded, improved, and added to as new services are proposed.

It will also be understood that the kind of services that are provided by data servers, and particularly by media servers, in keeping with the present invention, are such that they provide added value to the basic media processing services which may be provided to customers of any service provider.

The present discussion provides a system level view of the data server functionality, and teaches a processing engine for data servers that will undertake advanced services where the packetized media data of any customer of any service provider must be processed in real time or near real time.

Any data server in keeping with the packet present invention functions particularly as a device which may be directed to an internet protocol operating network, such as an IP network that is intended to carry VoIP/VoATM packet telephony signals. As such, such a data server as is taught by the present invention may be deployed at the edge of an IP, ATM, or other packet network so as to be located in a favourable geographic location, or so as to be located near the head end of a cable TV organization or a cable telecommunications service provider, or at the central office of an xDSL telecommunications service provider.

Implementation and support of multi-processing are provided by the distributed software architecture in keeping with the present invention, as described hereafter.

SUMMARY OF THE INVENTION

To that end, the present invention provides a data server for use in networks in which media signals are transmitted as digital signals in packet form, wherein the media signals are chosen from the group consisting of packetized audio data, packetized video data, packetized control data, packetized information data, and combinations thereof. The packets of media data are to be processed by the data server.

The data server comprises at least one shelf having at least one card thereon whose purposes are to provide a shelf control function and a media processor function, together with a plurality of inter-processor buses which communicate with the the at least one card on the shelf.

The shelf controller function provides access to control and management signals for distributed software which is distributed on the at least one card on the shelf. The media processor function provides access to and processing of the media signals in packet form.

The distributed software on the shelf consists of a modular software architecture having a transport layer, a media processing layer, a session control layer, and a management plane.

The management plane spans across the transport layer, the media layer, and the session control layer.

The at least one card contains a plurality of digital signal processors for the media processor function. The plurality of digital signal processors has a plurality of discrete software objects embedded therein, so as to be adapted to process the packets of media data in keeping with the software objects.

The plurality of discrete software objects are dynamically changeable under the control of the control and management signals which may be received and transmitted by the shelf controller function.

The management plane is adapted for provisioning and monitoring the operations of the data server, and also to give alarms in keeping with predetermined criteria therefor.

In keeping with a provision of the present invention, the distributed software architecture transport layer includes at least one connection interface to a packet network from which the media signals in packet form are received, and to which media signals in packet form are sent.

Also, the distributed software architecture media processing layer includes a software manager for initializing, coordinating, and controlling the plurality of discrete software objects that are embedded in the plurality of digital signal processors on the at least one card.

A data server of the present invention may be such that the shelf has but one card thereon. If so, that one card serves both of the shelf controller function and the media processor function. Also, that one card will have a plurality of processors thereon; and communication among the plurality of processors is by way of the plurality of inter-processor buses.

Moreover, a data server in keeping with the present invention may have a plurality of cards on the shelf. In that case, a plurality of inter-processor buses extend over a backplane as a plurality of backplane buses, so as to provide communication among the plurality of cards on the shelf.

Typically, a data server in keeping with the present invention is configured so that the shelf has a shelf controller card and at least one media processor card thereon. The plurality of backplane buses will communicate among all the cards on the shelf.

Further, in that case, the distributed software is distributed among the cards on the shelf.

Where there is at least one media processor card on the shelf, each such card will contain a plurality of digital signal processors having a plurality of discrete software objects embedded therein.

The distributed software architecture transport layer may further include a network abstraction layer which is adapted to provide an interface to the media processing layer for any media packet data that is received by the data server from the packet network by the at least one connection interface thereto.

There may also be a plurality of different connection interfaces to the packet network from the transport layer. Thus, modularity is provided for a plurality of media packet data service providers who may employ differing data packet delivery protocols and systems.

The media processing layer further includes logical input and output ports for logical communication to and from each of the transport layer and the session control layer.

The plurality of discrete software objects that are included in the media processing layer may be chosen from the group which consists of protocol handler software objects, audio processing software objects, mixer control software objects, video service software objects, facsimile service software objects, audio streaming software objects, audio recording software objects, audio announce software objects, audio gain control software objects, automatic gain control software objects, audio event detector software objects, media data encoder/decoder software objects, audio generator software objects, data scrambling (IPsec) software objects, quality-of-service tagging software objects, and combinations thereof.

Still further, the audio event detector software may be chosen from the group consisting of DTMF detector and decoder software, VAD detector software, loudest speaker detector software, and combinations thereof.

Also, the audio generator software objects may be chosen from the group consisting of DTMF generators, algorithmic tone generators, CNG (comfort noise generation) generator software, audio streaming software objects, audio playback software objects, and combinations thereof.

A further provision of the data server of the present invention is that the distributed software architecture session control layer includes a dialog control sublayer and a session management and administration sublayer.

The control sublayer includes at least one control interface for the data server.

The session management and administration sublayer is adapted to control and manage the software resources of the distributed software architecture independently of the control protocol of the network for digital media signals which are being transmitted in packet form, to which the data server is connected for receiving and processing those digital media signals.

The data server of the present invention may be such that the at least one control interface of the dialog control sublayer of the session control layer is adapted to be connected to a network for digital media signals being transmitted in packet form according to a controlled protocol which is chosen from the group of control protocols which consists of media gateway control protocol (MGCP), PacketCable™ NCS, PacketCable™ audio server specification, session initiation protocol (SIP), VoiceXML™, SALT, MEGACO, ITU-T, H.248, and combinations and derivatives thereof.

Typically, as indicated above, a data server in keeping with the present invention will be configured as a media server which is adapted for use in networks within which audio data are sent in the form of digital media packets.

Moreover, typically any data server in keeping with the present invention, whether it is configured as a media server or as a media gateway, may include a single card performing all functions; or a plurality of cards, of which some perform media processing functions, and other cards perform shelf controller functions for all cards mounted on the shelf.

Any data server in keeping with the present invention may be connected to at least one external audio file server and/or an external speech recognition file server.

If so, the external audio file server stores and passes recorded audio files to and from said at least one media processor card, and said external speech recognition file server streams synthesized audio to and from said at least one media processor card.

The digital media packets may be carried in a protocol chosen from the group consisting of: Internet Protocol (IP), asynchronous transfer mode (ATM) protocol, Frame Relay protocol, and combinations thereof A data server in keeping with the present invention may be configured as a media server which is adapted for use in networks within which audio data are sent in the form of digital media packets.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

A data server in keeping with the present invention will support multiple media types such as voice, data, image, video, and facsimile. It will also provide a plurality of services and applications such as voice and video conferencing, messaging, interactive voice response, video streaming, and the like.

As noted, data servers in keeping with the present invention are particularly intended for use in networks in which media signals are transmitted as digital signals in packet form. The media signals may be such as packetized audio data, packetized video data, packetized control data, packetized information data, and combinations thereof. In any event, the packets of media data are to be processed by the data server.

However, as noted above, while data servers in keeping with the present invention may be configured as media gateways, more typically they are configured as media servers, and it is that configuration to which the following discussion is particularly directed, for purposes of clarity and by way of example as to a typical architecture of data servers, such as media servers, which are in keeping with the present invention.

Typically, such a media server provides an array of re-programmable digital signal processors which are accessible by a real time transport protocol router. Thus, when media data—digital signals in packet form—enter a media server in keeping with the present invention, the media signals are routed directly to a digital signal processor via a backplane, and via the plurality of inter-processor buses on the media processor card or cards. Once the media data packets reach the digital signal processors, they may be processed in a variety and number of different ways. For example, real time image analysis and manipulation, including parallel processing of image/video data, for automated scene analysis and video indexing may be carried out using a media server in keeping with the present invention.

More particularly, media servers in keeping with the present invention find immediate functionality in telephony networks, particularly those which operate over an IP or ATM packet network.

Any digital signal processor on any media processor card, as described hereafter, will be seen to be software upgradeable so that new features and/or protocols may be added dynamically to the media server.

Indeed, in any session, programmability of the digital signal processors which populate the media processor cards may be dynamic, whereby efficiency of the hardware is maximized.

Figure 1:
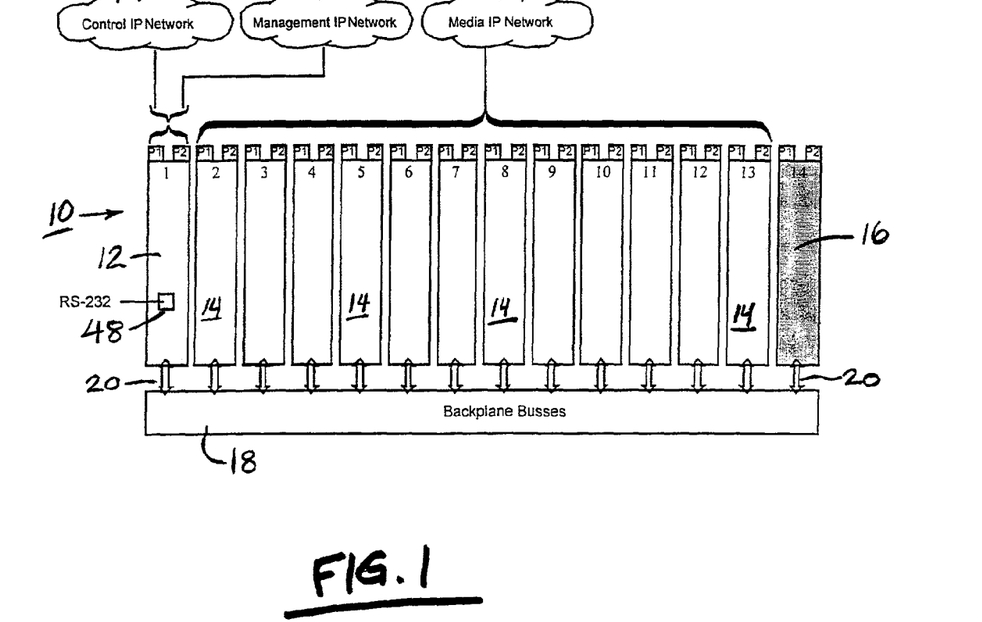
FIG. 1 provides a physical overview of a data server in keeping with the present invention.
Figure 2:
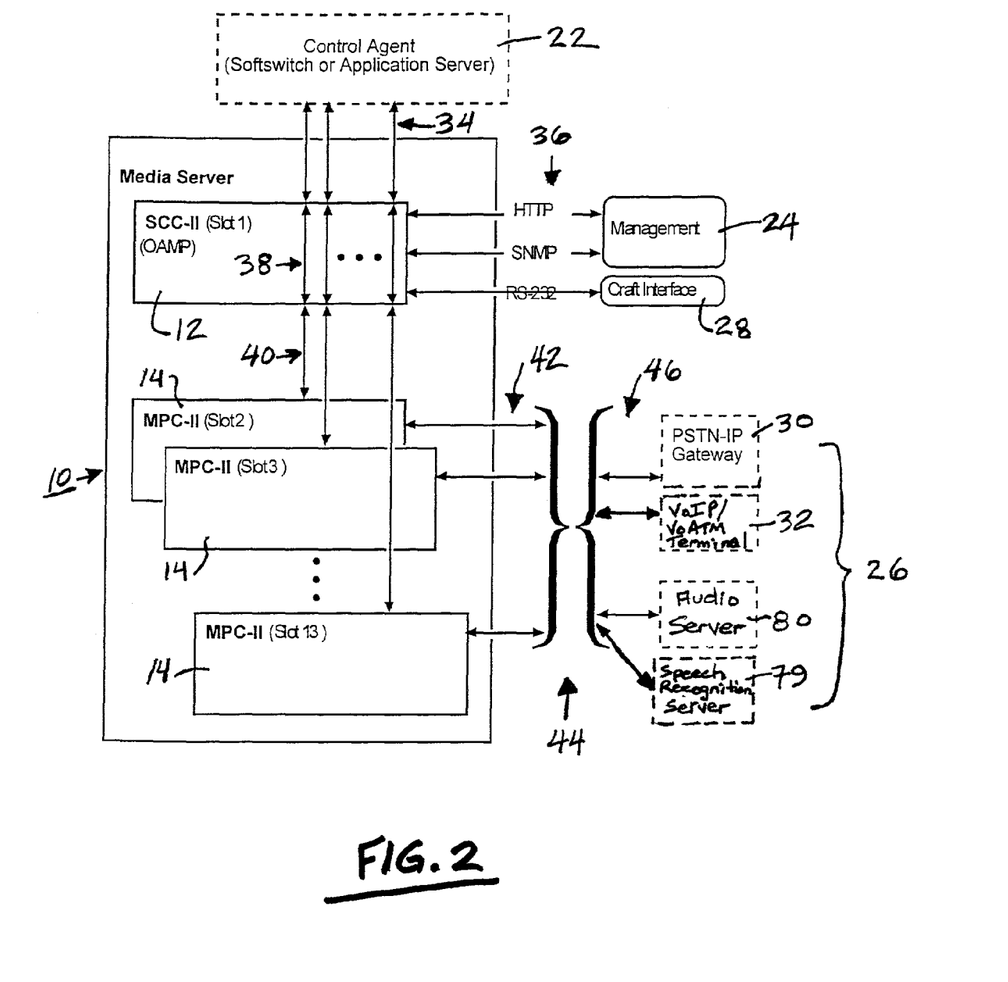
FIG. 2 provides a data and control signal flow overview of a data server in keeping with the present invention.

Referring now to FIGS. 1 and 2, two different conceptual representations of a data server in keeping with the present invention are shown, in each case, at 10. In FIG. 1, the conceptualization is effectively physical; in FIG. 2, the conceptualization is effectively in respect of the manner in which control and media signals are transported through the media server.

Typically, a data server in keeping with the present invention, configured as a media server as indicated in FIG. 1, will include a single shelf controller card 12, and a plurality of media processor cards 14. The shelf controller card and media processor cards are plugged into a card shelf, in well known manner.

The shelf will also have a plurality of backplane buses shown collectively at 18, all of which are connected to the respective cards 12, 14, 16, by bus connectors 20. More specific discussion of the respective structure and functions of the cards 12, 14, 16, and the buses 18, may be found in the co-pending applications noted above.

An IP or ATM network, or series of such networks, may be connected to the media server via Ethernet or otherwise. For example, a control IP network 22, a management IP network 24, and one or more media IP or ATM networks 26, may be connected to the media server 10, as those shown in FIGS. 1 and 2, and as discussed in greater detail hereafter.

It will be noted in FIGS. 1 and 2 that the control IP network 22 and a management IP network 24 are each connected to the shelf controller card 12.

A craft interface 28 may also be connected to the shelf controller card 12, as seen in FIG. 2. Typically, the craft interface 28 is connected to the shelf controller card 12 through an RS-232 interface 48; which is shown in FIG. 1, and which may provide other signal connectivity to the shelf controller card 12, such as for diagnostic purposes.

Moreover, as seen in FIG. 2, the control IP network 22 supports a control agent; and as noted above, that control agent may reside on a softswitch, or an application server.

Referring particularly to FIG. 2, it will first be noted that a media IP network 26 might optionally comprise a gateway 30 to a PSTN network, whereby appropriate signal management and translation may occur, or a VoIP/VoATM terminal 32, or both; together with an external audio file server 80 which exchanges recorded audio files with the data server, and an external speech recognition file server 79 which exchanges streams of audio data with the data server.

Typically, any media processor card 14 will exchange files with the external audio file server 80, using either an HTTP or NFS protocol. Such files are always recorded audio. The exchange of files from a media processor card 14 may be such that a card 14 can send audio recordings to the external audio file server 80, and retrieve audio recordings therefrom.

Exchange of recorded audio files with the speech recognition file server 79 is typically carried out using RTP/UDP/IP protocol. The speech recognition file server 79 can stream synthesized audio back to a media processor card 14 in the same manner. A control link is used by the media processor card 14 to inform the speech recognition file server 79 what to do with the audio being streamed to it, and also to gather information about the recorded audio after it has been analysed by a speech engine (not shown).

Other various protocols and connection modes are suggested in FIG. 2 for connection of the management IP network 24 and the craft interface 28, but they are exemplary only and are not intended to be limiting or specifically descriptive of the data server, configured as a media server or as a media gateway.

As seen in FIG. 2, control signals may pass between the shelf controller card 12 and the control agent 22, as at 34; and between the shelf controller card 12 and the management IP network 24, and the craft interface 28, through a provisioning interface as shown at 36.

Of course, signals pass through the shelf controller card 12 as at 38, and between the shelf controller card and the various media processor cards 14, across the backplane buses 18, as shown at 40 in FIG. 2.

Likewise, digital media data in packet form are passed to and from the various media processing cards 14, as shown at 42.

For the sake of convenience, the interface between the media server 10 and the media IP network 26 is shown as being through a packet network 44, to be discussed hereafter, via various signal connections as shown at 46.

Control signals in packet form flow between the media processing cards 14, and the recorded audio file server 80, as well as between the data server and the speech recognition file server 79 via links 42, 46 to the packet network 44.

Within the media server, and particularly within each of the media processing cards 14, there are a plurality of digital signal processors 50. They are shown in FIG. 3, by which an array of digital signal processors is shown, with a plurality of digital signal processors being indicated as being provided for each of the various cards shown in FIG. 1.

Figure 3:
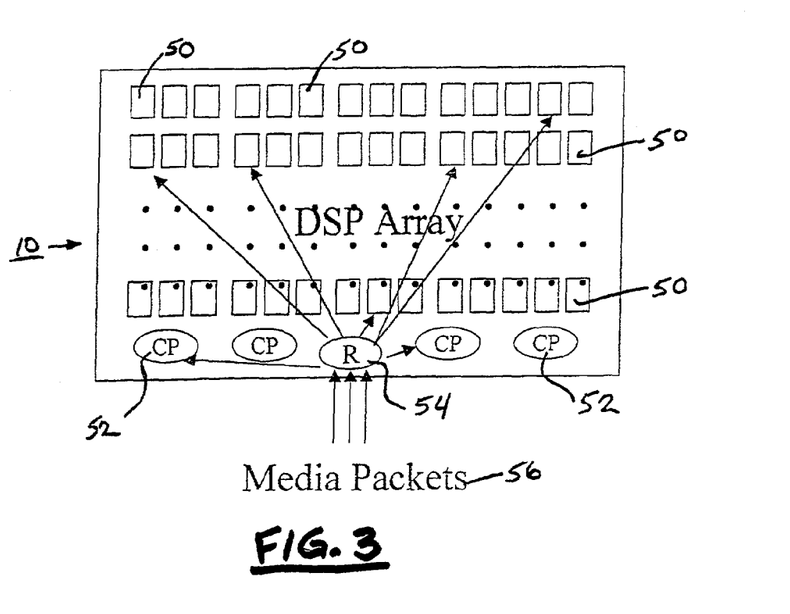
FIG. 3 provides an overview of how media packets may be distributed within a data server in keeping with the present invention.

Within the media server 10, as it is seen in FIG. 3, there are also a plurality of control processors 52, and a digital signal router 54 which functions in real time so as to distribute media data packets 56 throughout the media server 10 to the various digital signal processors 50.

The relationship among the FIGS. 1, 2, and 3, as they illustrate various aspects of a media server, its physical arrangement, and its signal and control flow arrangements, will now be clearly understood.

It will also be seen that the shelf controller card 12 provides access to control and management signals for distributed software which is distributed among the cards on the shelf, and of course that the media processor cards provide access to the media signals which enter the media server in packet form from the media IP network 26.

Figure 4:
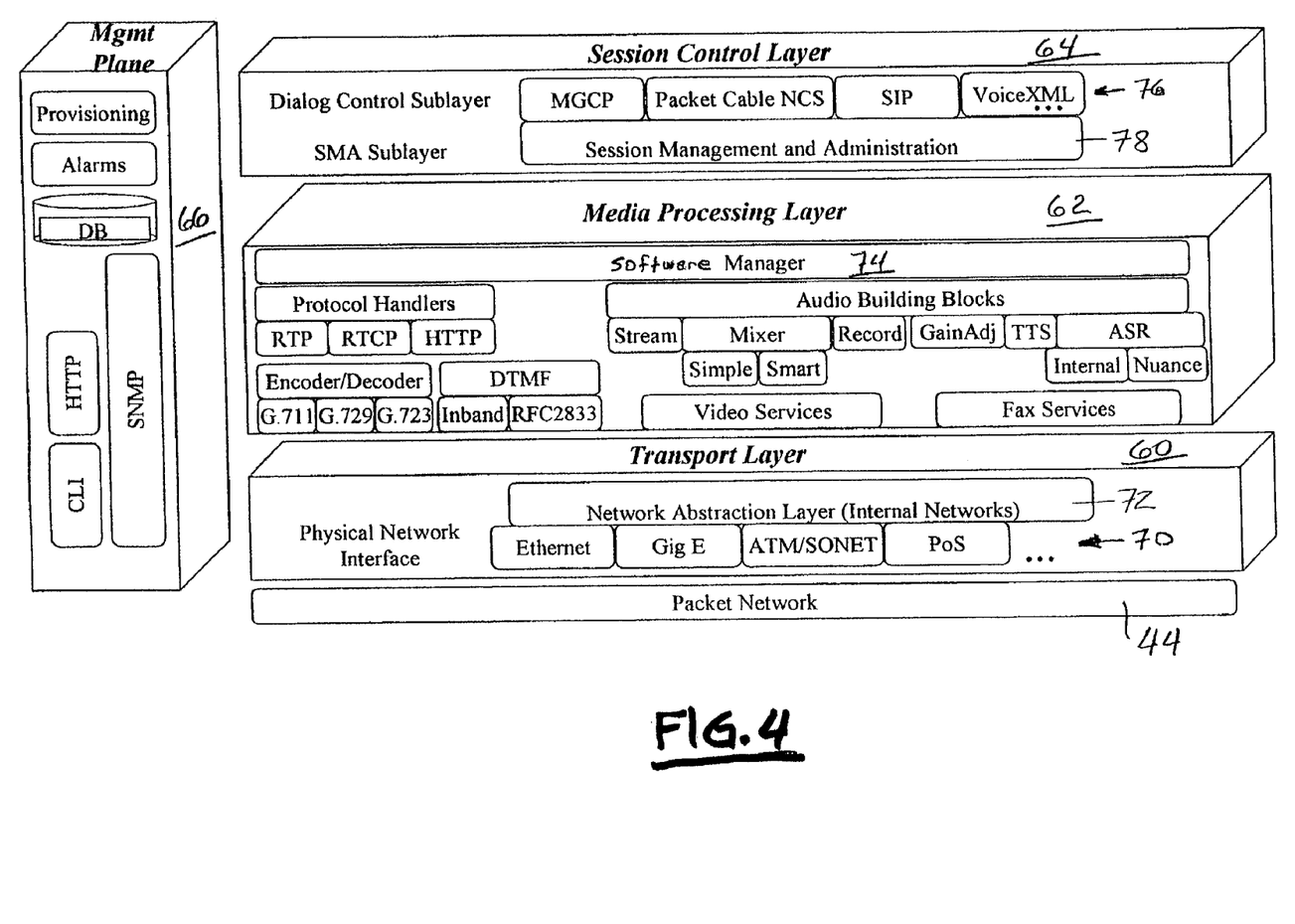
FIG. 4 provides an overview of the software architecture of the present invention.

Referring now to FIG. 4, the architecture of the distributed software which is distributed among the cards on the shelf is now described. First, it will be noted that the software architecture is modular, and that it comprises four principal components. They are a transport layer 60, a media processing layer 62, a session control layer 64, and a management plane 66. It will be noted that the management plane 66 spans across the transport layer 60, the media processing layer 62, and the session control layer 64.

It has been stated above, and should be clearly understood, that the digital signal processors 50 which are distributed among the cards on the shelf of the media server 10, are each adapted to process the media data packets 56 as they enter the media server 10, in keeping with a plurality of discrete software objects which are embedded in the various digital signal processors 50.

It will also be understood that the plurality of discrete software objects within the plurality of digital signal processors 50 are dynamically changeable under the control of the control and management signals at 34, 38, and 40. Thus, as noted, the discrete software objects which are linked to various services may be modified, upgraded, or added to, at any time. The discrete software objects can also be modified by the provisioning interface 36 at start-up, or in a non-time-critical manner.

It will be seen from FIG. 4 that several purposes of the management plane 66 include the provisioning and monitoring of the operations of the media server, providing database facilities, management protocol facilities, and the like.

Another purpose which is served by the management plane 66 is to give alarms in keeping with predetermined criteria therefore; it being understood that as the management plane 66 monitors the layers of the software architecture in keeping with the present invention, anomalies in the operation of the software will be detected and an appropriate alarm will be given, or other corrective steps will be taken.

A variety of protocols and service identities are noted in FIG. 4. They are not intended to be limiting in any manner, as they are illustrative only, and refer to a typical system software architecture for a data server in keeping with the present invention.

Within the distributed software architecture of the present invention, the transport layer 60 includes at least one connection interface 70, which provides for interconnection to a packet network 44 from which the media signals in packet form are received. There is also a network abstraction layer 72, which is adapted to provide an interface to the media processing layer 62 for any media packet data which is received by the media server 10 from the packet network 44.

As noted, within the connection interface sublayer 70, there may be a plurality of different connection interfaces to the packet network 44. Thus, modularity is provided for a plurality of media packet data service providers who may employ differing data packet delivery protocols and systems. That may mean two things: first, a data server in keeping with the present invention may be essentially delivered "off the shelf" to any service provider whose business includes the handling, transmitting, and processing of media packet data. It also means that the service provider might, itself, operate more than one media packet data packet delivery protocol, all connected to the same data server 10.

Referring to the media processing layer 62, it will be seen that among the various components within that layer there is a software manager 74. The purpose of the software manager is to initialize, coordinate, and control the plurality of discrete software objects that are embedded in the plurality of digital signal processors 50 on each one of the at least one media processor cards 14. The discrete software objects are generally relatively small software objects that are written in such a manner that, even though they are initialized, they do not consume any processing resources of the digital signal processors where they reside until such time as they are running.

The media processing layer 62 also includes logical input and output ports (not indicated because they are effectively hardware items), which permit for logic communication to and from each of the transport layer 60 and the session control layer 64.

The plurality of software objects which may be included in the media processor layer may be quite varied. As noted, there are specific services and protocols noted in FIG. 4, and they are exemplary in respect of a typical embodiment of a media processor 10, but they are not otherwise discussed and described herein.

However, it is typical of any media processor in keeping with the present invention that the discrete software objects which are included in the media processing layer may include the following: protocol handlers, audio processing software objects, mixer control software objects, video service software objects audio steaming software objects, facsimile service software objects, audio recording software objects, audio announce software objects, audio gain control software objects, audio event detector software objects, media data encoder/decoder software objects, audio generator software objects, data scrambling (IPsec) software objects, quality-of-service tagging software objects, and combinations thereof.

If so, then typically the audio event detector software is chosen from the group consisting of DTMF detector and decoder software, VAD detector software, loudest speaker detector software, and combinations thereof.

Also, typically the audio generator software objects are chosen from the group consisting of DTMF generators, algorithmic tone generators, CNG (comfort noise generation) generator software, audio streaming software objects, audio playback software objects, and combinations thereof.

Referring now to the session control layer 64, it will be seen that that layer includes a dialog control sublayer 76, and a session management and administration sublayer 78.

The dialog control sublayer 76 includes at least one control interface for the media server 10. That is the interface by which the media server 10 will communicate to the control IP network 22 and/or the management IP network 24.

Moreover, the session management and administration sublayer 78 is adapted to control and manage the software resources of the distributed software architecture shown in FIG. 4, independently of the control protocol which is passed to the media processors via paths 34, 38, and 40. That is to say, no matter what protocol is being employed to control the processing of the digital media signals that are received by the media server, the session management and administration sublayer will manage the software resources of the media server independently of that control protocol, so that the media data packets 56 (FIG. 3) will reach the discrete software objects which are embedded in the media processor layer 62.

Typically, there is one control interface, but there may be a plurality of control interfaces in the dialog control sublayer 76. Any control interface in that dialog control sublayer is adapted to be connected to a network for digital media signals being transmitted in packet form under the control of a protocol which may be chosen, typically, from the group of control protocols which consists of media gateway control protocol (MGCP), PacketCable™ NCS, PacketCable™ audio server specifiaction, session initiation protocol (SIP), VoiceXML™, MEGACO, SALT, and combinations thereof.

There has been described a data server, and particularly there has been described a media server having a preferred embodiment of an architecture for distributed software which is found among the cards on a card shelf within a media server. It has been noted that the plurality of discrete software objects which are to be found on the digital signal processors distributed among the media processor cards within a data server of the present invention are dynamically changeable by being upgraded, modified, or added to, under the control of control and management signals which are delivered via a control and management system from a control IP network or a management IP network that are external to the media server—typically from a softswitch, an application server, a server management system, or an element management system.

The data server, particularly as described in its embodiment as a media server, is adapted to provide a plurality of varying media processing services on packetized media data delivered to the data server; and the media processing will occur independently of the protocol by which the packetized media data has been delivered to the data server.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A data server for use in networks in which media signals are transmitted as digital signals in packet form, wherein packets of media data from said networks are to be processed by said data server;

said data server comprising:

at least one shelf having at least one card thereon providing a shelf controller function and a media processor function;

the card providing the media processor function having a plurality of inter-processor buses communicating with digital signal processors thereon, and a digital signal router to distribute media data packets to the various digital signal processors;

at least one control and management interface for receiving external control and management signals in packetized form;

at least one connection interface for sending out to, and receiving said media signals from a media network;

wherein said shelf controller function provides access through said at least one control and management interface to control and management signals for distributed software which is distributed on said at least one card on said shelf, and said media processor function provides access to and processing of said media signals in packet form;

wherein said distributed software on said shelf consists of a modular software architecture having a transport layer, a media processing layer, a session control layer, and a management plane;

wherein said management plane spans across said transport layer, said media layer, and said session control layer;

wherein the digital signal processors providing the media function perform said media function in real time to process incoming signals received on said at least one connection interface and prepare said processed media signals for sending out on said at least one connection interface, said plurality of digital signal processors having a plurality of discrete software objects embedded therein so as to be adapted to process said packets of media data in keeping with said software objects;

wherein said plurality of discrete software objects are dynamically changeable under the control of said control and management signals through said at least one control interface;

wherein said management plane is adapted for provisioning and monitoring the operations of said data server, and to give alarms in keeping with predetermined criteria therefor; and wherein said distributed software architecture media processing layer includes a software manager for initializing, coordinating, and controlling said plurality of discrete software objects embedded in a plurality of digital signal processors on said at least one card.

2. The data server of claim 1, wherein said shelf has one card thereon, wherein said one card serves both of said shelf controller function and said media processor function, and wherein communication among said plurality of processors is by way of said plurality of inter-processor buses.

3. The data server of claim 1, wherein there are a plurality of cards on said shelf, and wherein a plurality of inter-processor buses extend over a backplane as a plurality of backplane buses, so as to provide communication among said plurality of cards on said shelf.

4. The data server of claim 3, wherein said shelf has a shelf controller card and at least one media processor card thereon, and wherein said plurality of backplane buses communicates among all the cards on said shelf.

5. The data server of claim 4, wherein said distributed software is distributed among said cards on said shelf.

6. The data server of claim 5, wherein each said at least one media processor card contains a plurality of digital signal processors having a plurality of discrete software objects embedded therein.

7. The data server of claim 1, wherein said distributed software architecture transport layer further includes a network abstraction layer which is adapted to provide an interface to said media processing layer for any media packet data received by said data server from said packet network by said at least one connection interface thereto.

8. The data server of claim 3, wherein said distributed software architecture transport layer further includes a network abstraction layer which is adapted to provide an interface to said media processing layer for any media packet data received by said data server from said packet network by said at least one connection interface thereto.

9. The data server of claim 8, wherein there are a plurality of different connection interfaces to said packet network from said transport layer, whereby modularity is provided for a plurality of media packet data service providers employing differing data packet delivery protocols and systems.

10. The data server of claim 1, wherein said media processing layer further includes logical input and output ports for logic communication to and from each of said transport layer and said session control layer.

11. The data server of claim 3, wherein said media processing layer further includes logical input and output ports for logic communication to and from each of said transport layer and said session control layer.

12. The data server of claim 1, wherein said plurality of discrete software objects included in said media processing layer are chosen from the group consisting of: protocol handler software objects, audio processing software objects, mixer control software objects, video service software objects, facsimile service software objects, audio streaming software objects, audio recording software objects, audio announce software objects, audio gain control software objects, automatic gain control software objects, audio event detector software objects, media data encoder/decoder software objects, audio generator software object, data scrambling (IPsec) software objects, quality-of-service tagging software objects, and combinations thereof.

13. The data server of claim 3, wherein said plurality of discrete software objects included in said media processing layer are chosen from the group consisting of: protocol handler software objects, audio processing software objects, mixer control software objects, video service software objects, facsimile service software objects, audio streaming software objects, audio recording software objects, audio announce software objects, audio gain control software objects, automatic gain control software objects, audio event detector software objects, media data encoder/decoder software objects, audio generator software object, data scrambling (IPsec) software objects, quality-of-service tagging software objects, and combinations thereof.

14. The data server of claim 13, wherein said audio event detector is chosen from the group consisting of DTMF detector and decoder software, VAD detector software, loudest speaker detector software, and combinations thereof.

15. The data server of claim 14, wherein said audio event detector software is chosen from the group consisting of DTMF generators, algorithmic tone generators, (CNG (comfort noise generation) generator software, audio streaming software objects, audio playback software objects, and combinations thereof.

16. The data server of claim 11, wherein said distributed software architecture session control layer includes a control sublayer and a session management and administration sublayer;

wherein said dialog control sublayer includes at least one control interface for said data server; and wherein said session management and administration sublayer is adapted to control and manage the software resources of said distributed software architecture independently of the control protocol of the network for digital media signals being transmitted in packet form to which said data server is connected for receiving and processing said digital media signals.

17. The data server of claim 16, wherein said at least one control interface of said dialog sublayer of said session control layer is adapted to be connected to a network for digital media signals being transmitted in packet form according to a controlled protocol chosen from the group of control protocols consisting of: media gateway control protocol (MGCP)), Packetcable™ NCS, PacketCable™ audio server, session initiation control protocol (SIP) VoiceXML™, SALT, MEGAGO, ITU-T, H.248, and combinations and derivatives thereof.

18. The data server of claim 1, wherein said data server is configured as a media server which is adapted for use in networks within which audio data are sent in the form of digital media packets.

19. The data server of claim 3, wherein said data server is configured as a media server which is adapted for use in networks within which audio data are sent in the form of digital media packets.

20. The data server of claim 18, wherein said media server is connected to at least one of an external audio file server and an external speech recognition file server;
wherein said external audio file server stores and passes recorded audio files to and from said at least one media processor card, and said external speech recognition file server streams synthesized audio to and from said at least one media processor card.

21. The data server of claim 18, wherein said media server is connected to at least one of an external audio file server and an external speech recognition file server;
wherein said external audio file server stores and passes recorded audio files to and from said at least one media processor card, and said external speech recognition file server streams synthesized audio to and from said at least one media processor card.

22. The data server of claim 18, wherein said digital media packets are carried in a protocol chosen from the group consisting of: Internet Protocol (IP), asynchronous transfer mode (ATM) protocol, Frame Relay Protocol, and combinations thereof.

23. The data server of claim 19, wherein said digital media packets are carried in a protocol chosen from the group consisting of: Internet Protocol (IP), asynchronous transfer mode (ATM) protocol, Frame Relay Protocol, and combinations thereof.

24. The data server of claim 4, wherein a plurality of media processors cards are on said shelf.

25. The data server of claim 24, wherein said data server is configured as a media server which is adapted for use in networks within which audio data are sent in the form of digital media packets.

26. The data server of claim 17, further comprising at least two shelf controller cards, wherein at least a second shelf controller card functions as a backup shelf controller card for a first shelf controller card.

27. The data server of claim 25, wherein said data server is configured as a media server which is adapted for use in networks within which audio data are sent in the form of digital media packets.

28. The data server of claim 1, wherein said data server is configured as a media gateway which is adapted for use in networks within which audio data are sent in the form of digital media packets.

29. The data server of claim 3, wherein said data server is configured as a media gateway which is adapted for use in networks within which audio data are sent in the form of digital media packets.

30. The data server of claim 25, wherein said data server is configured as a media gateway which is adapted for use in networks within which audio data are sent in the form of digital media packets.

31. The data server of claim 30, wherein said data server is configured as a media server which is adapted for use in networks within which audio data are sent in the form of digital media packets.

32. The data server of claim 24, further comprising at least one further media processor card, wherein said at least one further media processor card functions as a backup media processor for any other one of said plurality of media processor cards.

* * * * *